(12) United States Patent
Drozdzowski et al.

(10) Patent No.: US 9,787,553 B1
(45) Date of Patent: Oct. 10, 2017

(54) PARTIAL CHANNEL FILTERING

(71) Applicant: NOKIA SOLUTIONS AND NETWORKS OY, Espoo (FI)

(72) Inventors: Grzegorz Drozdzowski, Wysoka (PL); Jukka Tuomas Mikkonen, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/374,152

(22) Filed: Dec. 9, 2016

(51) Int. Cl.
*H04K 1/02* (2006.01)
*H04L 12/26* (2006.01)
*H04L 27/26* (2006.01)
*H04W 88/08* (2009.01)

(52) U.S. Cl.
CPC ........ *H04L 43/028* (2013.01); *H04L 27/2601* (2013.01); *H04W 88/08* (2013.01)

(58) Field of Classification Search
CPC ............... H04L 5/0007; H04L 27/2626; H04L 27/2601; H04L 25/03012
USPC ........................ 375/260, 295, 296
See application file for complete search history.

(56) References Cited

U.S. PATENT DOCUMENTS 9,246,721 B1\* 1/2016 Martinez .............. H04B 1/0007

\* cited by examiner

*Primary Examiner* — Rahel Guarino
(74) *Attorney, Agent, or Firm* — Squire Patton Boggs (US) LLP (57) ABSTRACT

Various communication systems may benefit from improved radio signaling. For example, communication systems may benefit from selective or partial filtering of a radio signal. A method, in certain embodiments, may include analyze at a network entity a radio signal comprising a plurality of orthogonal frequency division multiplexing symbols. The radio signal comprises at least one point of discontinuity between the plurality of symbols. The method may also include filtering a select time domain sample of the radio signal in the plurality of symbols. The select sample surrounds the at least one point of discontinuity. In addition, the method may include replacing the select time domain sample surrounding the at least one point of discontinuity of the radio signal with the filtered sample in the plurality of symbols.

17 Claims, 12 Drawing Sheets

PARTIAL CHANNEL FILTERING

BACKGROUND

Field

Various communication systems may benefit from improved radio signaling. For example, communication systems may benefit from selective or partial filtering of a radio signal.

Description of the Related Art

In 3rd Generation Partnership Project (3GPP) Long Term Evolution (LTE), $4^{th}$ generation (4G), or 5th generation (5G) network technology, a single radio signal frame includes a plurality Orthogonal Frequency-Division Multiplexing (OFDM) symbols. For example, in a single 4G radio signal frame includes 120 to 140 OFDM symbols. The number of symbols in the radio frame can depend on the slot format of the radio signal being used. Radio signals having OFDM symbols exhibit discontinuity between adjacent OFDM symbols. The discontinuity, for example, can be caused by the phase differences between adjacent OFDM symbols, and may lead to out of band (OOB) energy leakage.

The discontinuity in the radio signal causes the frequency response, or the adjacent channel leakage ratio (ACLR), of a transmitted signal to worsen. ACLR is the ratio of the radio resource control (RRC) filtered mean power centered on the adjacent channel frequency to the RRC filtered mean power centered on the assigned channel frequency. In other words, the ACLR is the ratio of the transmitted power to the power in the adjacent radio channel. The points of discontinuity between adjacent OFDM symbols may worsen the ACLR to a point where the ACLR threshold of 3GPP specification cannot be met without channel filtering. Channel filters are therefore used to filter all transmitted time domain samples of the OFDM symbols in the radio signal. The channel filter, which may be a complex filter such as a finite impulse response (FIR) filter, consumes a large amount of Digital Signal Processing (DSP) resources in order to filter the entire radio signal.

SUMMARY

A method, in certain embodiments, may include analyze at a network entity a radio signal comprising a plurality of orthogonal frequency division multiplexing symbols. The radio signal includes at least one point of discontinuity between the plurality of symbols. The method may also include filtering a select time domain sample of the radio signal in the plurality of symbols. The select sample surrounds the at least one point of discontinuity. In addition, the method may include replacing the select time domain sample surrounding the at least one point of discontinuity with the filtered sample in the plurality of symbols.

According to certain embodiments, an apparatus may include at least one memory including computer program code, and at least one processor. The at least one memory and the computer program code may be configured, with the at least one processor, to cause the apparatus at least to analyze at a network entity a radio signal including a plurality of orthogonal frequency division multiplexing symbols. The radio signal includes at least one point of discontinuity between the plurality of symbols. The at least one memory and the computer program code may also be configured, with the at least one processor, at least to filter a select time domain sample of the radio signal in the plurality of symbols. The select sample surrounds the at least one point of discontinuity. In addition, the at least one memory and the computer program code may also be configured, with the at least one processor, at least to replace the select time domain sample surrounding the at least one point of discontinuity with the filtered sample in the plurality of samples.

An apparatus, in certain embodiments, may include means for analyzing at a network entity a radio signal including a plurality of orthogonal frequency division multiplexing symbols. The radio signal includes at least one point of discontinuity between the plurality of symbols. The apparatus may also include means for filtering a select time domain sample of the radio signal in the plurality of symbols. The select sample surrounds the at least one point of discontinuity. In addition, the apparatus may include means for replacing the select time domain sample surrounding the at least one point of discontinuity with the filtered sample in the plurality of symbols.

According to certain embodiments, a non-transitory computer-readable medium encoding instructions that, when executed in hardware, perform a process. The process may include analyzing at a network entity a radio signal including a plurality of orthogonal frequency division multiplexing symbols. The radio signal includes at least one point of discontinuity between the plurality of symbols. The process may also include filtering a select time domain sample of the radio signal in the plurality of symbols. The select sample surrounds the at least one point of discontinuity. In addition, the process may include replacing the select time domain sample surrounding the at least one point of discontinuity with the filtered sample in the plurality of symbols.

According to certain embodiments, a computer program product encoding instructions for performing a process according to a method including analyzing at a network entity a radio signal comprising a plurality of orthogonal frequency division multiplexing symbols. The radio signal includes at least one point of discontinuity between the plurality of symbols. The method may also include filtering a select time domain sample of the radio signal in the plurality of symbols. The select sample surrounds the at least one point of discontinuity. In addition, the method includes replacing the select time domain sample surrounding the at least one point of discontinuity with the filtered sample in the plurality of symbols.

BRIEF DESCRIPTION OF THE DRAWINGS

For proper understanding of the invention, reference should be made to the accompanying drawings, wherein.

DETAILED DESCRIPTION

Certain embodiments provide for partial channel filtering for radio signals used for data transmissions. In some embodiments, the data transmission may be a downlink or an uplink transmission. In particular, certain embodiments selectively filter the samples surrounding or bordering the points of discontinuity between OFDM symbols in a radio signal. Filtering those samples surrounding the points of discontinuity or the border between symbols, may allow for meeting the 3GPP specification requirements for ACLR, while decreasing the amount of DSP resources used for channel filtering. The DSP resources may then be shared among multiple filters, while in other examples a single channel filter may be used to process a plurality of radio signals. The filtering can occur, for example, in the digital front end (DFE) component inside a radio module of the base station.

Figure 1:
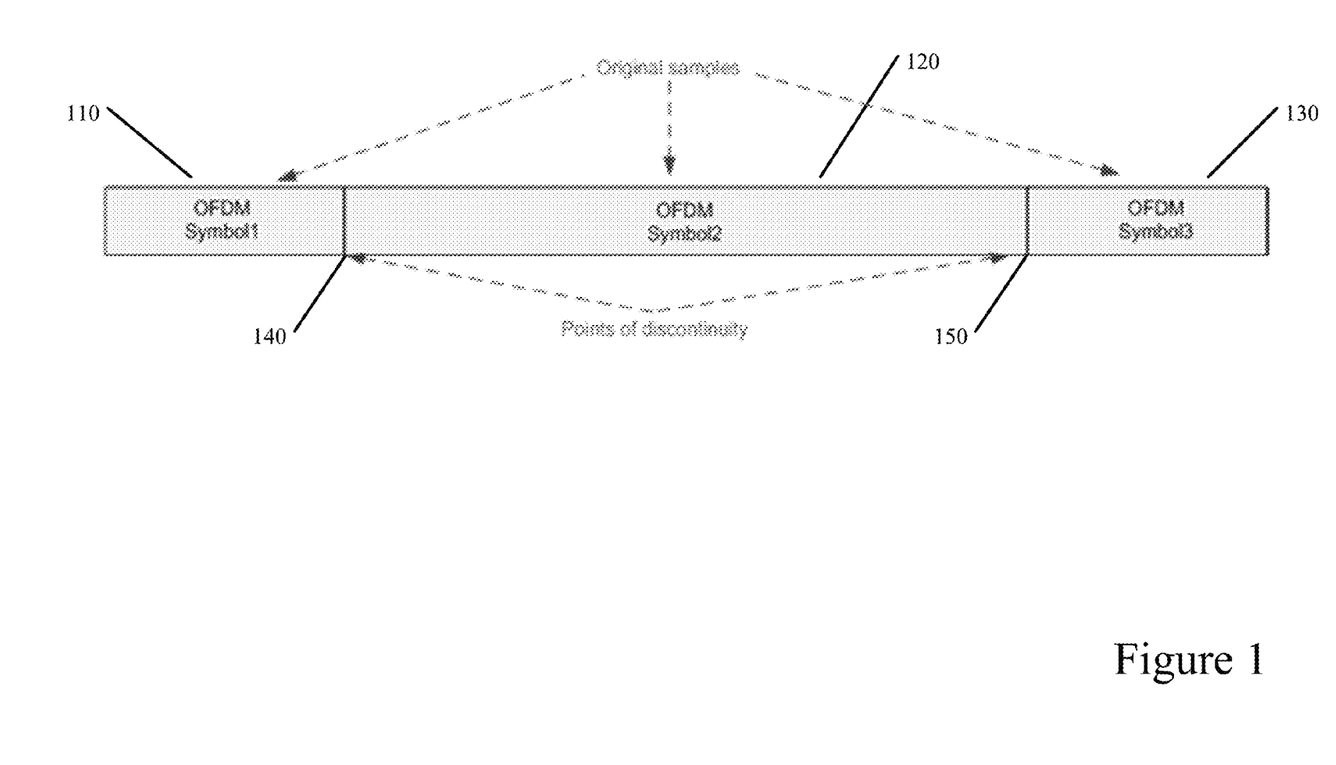
FIG. 1 illustrates a radio signal frame according to certain embodiments.

FIG. 1 illustrates a radio signal frame according to certain embodiments. In particular, FIG. 1 illustrates a single radio signal including three different OFDM symbols. Each symbol may include a finite number of samples. The number of samples may depend on the carrier bandwidth, and may be 128, 256, 512, 1024, 1536, or 2048, for example. The cyclic prefix, on the other hand, may be 160 for the first symbol, and 144 samples for the rest of the symbols. In other embodiments, the cyclic prefix may include 9, 18, 36, 72, or 108 samples. In other embodiments, any other number of samples may be included either in the prefix or in the symbol. In other embodiments, the symbols may be any other symbol that can be used in a radio signal, such as a Single Carrier Frequency Division Multiple Access (SC-FDMA) or Orthogonal Frequency-Division Multiple Access (OFDMA). First symbol 110 and second symbol 120 may be considered adjacent symbols, while second symbol 120 and third symbol 130 may also be considered adjacent symbols. A first point of discontinuity 140 may exist between first symbol 110 and second symbol 120. The discontinuity may be cause by a phase difference between the symbols. A second point of discontinuity 150 may exist between second symbol 120 and third symbol 130. In some embodiments, the radio signal may be a downlink baseband signal.

Figure 2:
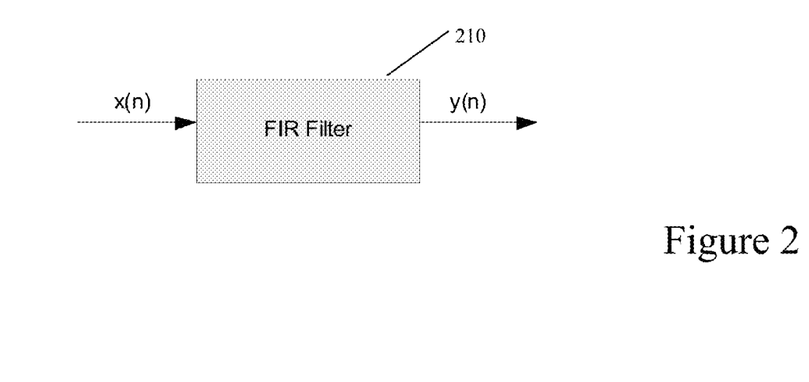
FIG. 2 illustrates a system according to certain embodiments.

FIG. 2 illustrates a system according to certain embodiments. In particular, FIG. 2 illustrates a channel filter 210, such as a digital FIR-filter. In traditional filters, all transmitted time domain samples of the OFDM symbols are fed to input x(n) of the FIR-filter. Output y(n) is a filtered version of the input signal which does not contain a point of discontinuity between adjacent symbols. In other words, the filter may mask the phase differences between the OFDM symbols, and improve the signal quality.

Figure 3:
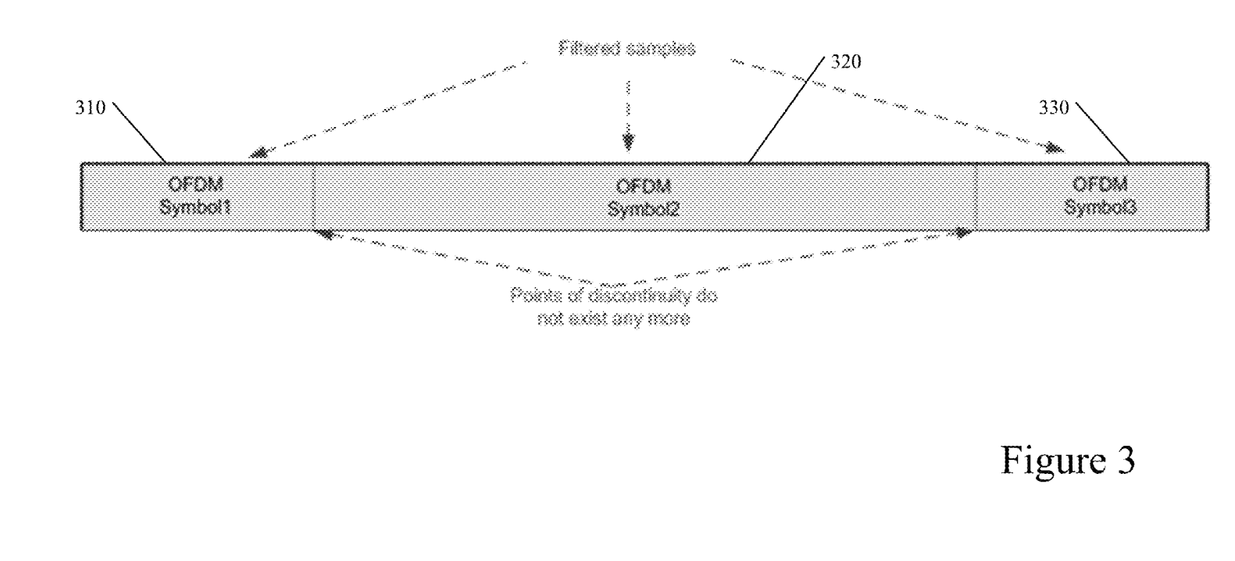
FIG. 3 illustrates a radio signal frame according to certain embodiments.

FIG. 3 illustrates a radio signal frame according to certain embodiments. In particular, FIG. 3 illustrates a radio frame that has been filtered using, for example, a filter as shown in FIG. 2. As can be seen in FIG. 3, the discontinuities between symbols 310, 320, and 330 have been removed via filtering. In such an embodiment, however, the entire signal and all of the samples included therein gets filtered, even though about 80 to 90% of the samples may not need filtering. While filtering all of the samples in a given OFDM symbol may give a little bit better frequency response or ACLR, filtering the entire symbol may worsen other measured signal qualities, such as error vector magnitude (EVM).

Figure 4:
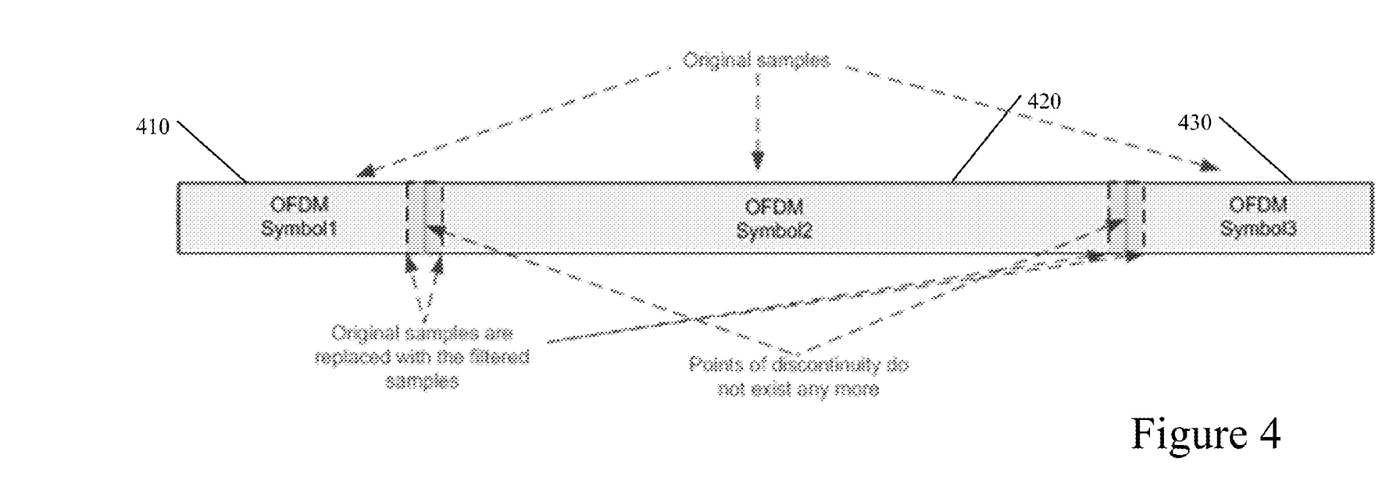
FIG. 4 illustrates a radio signal frame according to certain embodiments.

FIG. 4 illustrates a radio signal frame according to certain embodiments. In particular, FIG. 4 illustrates a filtered radio signal in which the time domain samples surrounding the points of discontinuity have been selectively filtered. The discontinuity between the filters may be located between adjacent OFDM symbols. In other words, the discontinuity occurs at the borders of the respective OFDM symbols. The time domain borders may be at least one or more sample at the end of the symbol and at least one or more sample the beginning of the adjacent symbol. The discontinuity may be caused because the symbols are formed independently without knowledge about adjacent symbols. This may lead to a phase difference between the symbols of the radio signal.

In certain embodiments, the time domain samples surrounding the points of discontinuity may be selectively filtered as shown in FIG. 4. FIG. 4 shows three OFDM symbols 410, 420, and 430, whose original samples surrounding the points of discontinuity have been replaced with filtered samples. As previously discussed, the filtered samples may be a single sample at the end of one OFDM symbol, and a single sample at the beginning of the adjacent OFDM symbol. For example, the length of the filtered part of the radio signal may be two times the filter length in samples. The filtered part may be two times the filter length because the filter may be fed with previous symbol samples before the border and let the whole filter response leave the filter after the border. In some embodiments, therefore, the filter length may be 57 or 65 samples, meaning that the filtered part of the radio signal may be 114 or 130 samples minimum, respectively. The filter may be any other length. In other embodiments, two or more samples surrounding the point of discontinuity from each of the adjacent OFDM symbols may be replaced.

In some embodiments, the samples surrounding the at least one discontinuity may be selectively replaced. Selective replacement may mean that only the samples surrounding the discontinuity are filtered, instead of all of the samples in the symbol. In other words, rather than then the entire symbol being filtered, the symbol is partially filtered and only those samples surrounding the discontinuity are filtered.

Figure 5:
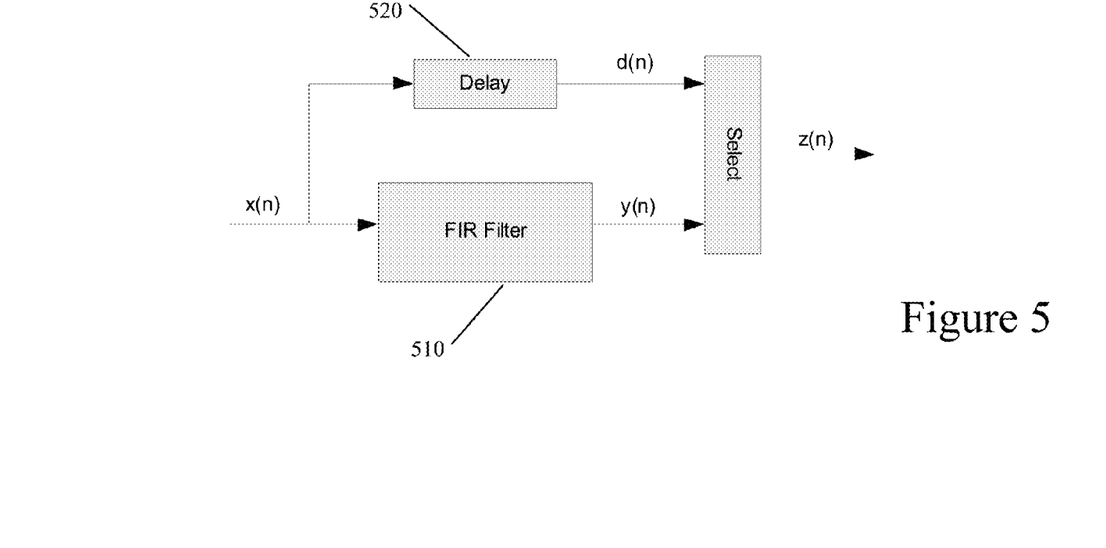
FIG. 5 illustrates a system according to certain embodiments.

FIG. 5 illustrates a system according to certain embodiments. Input x(n) of the filter is fed to FIR-filter 510 and to delay block 520. The output of the filter is filtered signal y(n). The output of the delay block d(n) may be an unfiltered signal with same algorithm delay as the filtered signal y(n) being outputted from FIR-filter 510. A select block may be used to select either filtered y(n) or unfiltered d(n) signal to output z(n) of the system. The delay block can be used because switching from y(n) to d(n) causes point of discontinuity if delays of the signals are different. The delay block may therefore be used to compensate for the phase difference between the samples of the filtered signal y(n). In certain embodiments, however, the delay block may not be used. The z(n) represents an outputted radio signal that was selected from delay block 520 d(n) or FIR filter y(n) 530.

Figure 6:
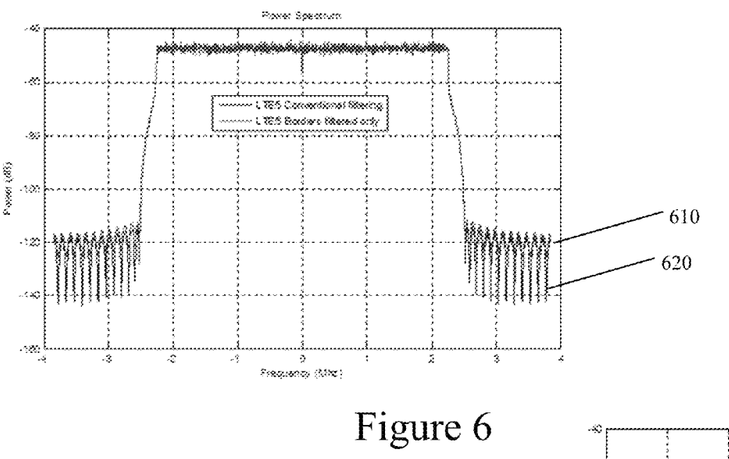
FIG. 6 illustrates power spectrum measurements according to certain embodiment.
Figure 7:
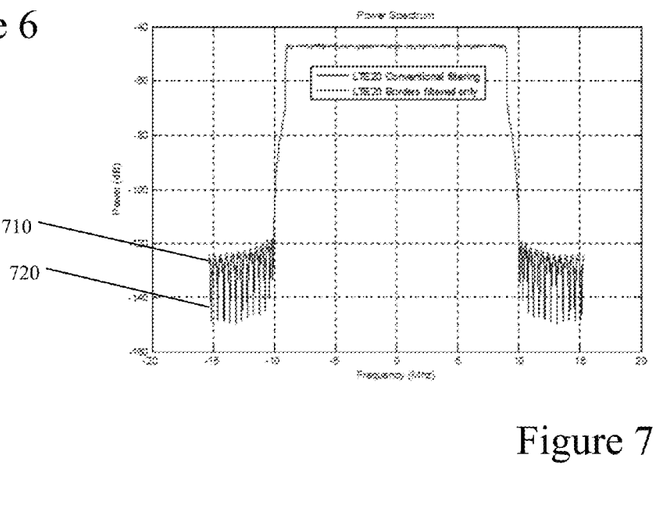
FIG. 7 illustrates power spectrum measurements according to certain embodiments.

FIGS. 6 and 7 represent power spectrum measurements of a radio signal according to certain embodiments. In particular, the figures illustrate simulation results of partial filtering 620 and 720, in which samples are selectively filtered at the borders of the OFDM symbols. In addition, the figures also illustrate another filtering 610 and 710, in which the entire radio signal is filtered. Both figures utilize the same 63-tap FIR filter for both the partial filtering and the another filtering. In FIG. 6, even though the ACLR result of the partial filtering 620 may be a bit worse than the another filtering 610, both filters can satisfy the 3GPP predetermined threshold. In other words, the ACLR of the filters are equal to or smaller than a predetermined maximum adjacent channel leakage ratio. The predetermined maximum adjacent channel leakage ratio may be set via a standard setting body, such as a 3GPP.

In FIGS. 6 and 7, the partial filtering gives a little bit better EVM results for both use cases. For example, in FIG. 6 the EVM simulation result of a radio signal being filtered by the another filtering 610 is 0.6841%, while the EVM simulation result of a radio signal being filtered by partial filtering 610 is 0.4694%. In FIG. 7, the EVM simulation result of a radio signal being filtered by the another filtering 710 is 0.5347%, while the EVM simulation result of a radio signal being filtered by partial filter 710 is 0.1888%.

In certain embodiments, the same filter, for example a FIR filter, may be used for both the partial filtering and the another filtering. The another filtering involves filtering of the entire radio signal, including all of the samples of a given symbol. In embodiments utilizing partial filtering, however, DSP resources used for channel filtering may be saved. For example, 80-90% of the DSP resources may be saved. This decreased resource use may allow the allotted or available DSP processing resources to be shared between multiple filters, which may further decrease size and power consumption.

Figure 8:
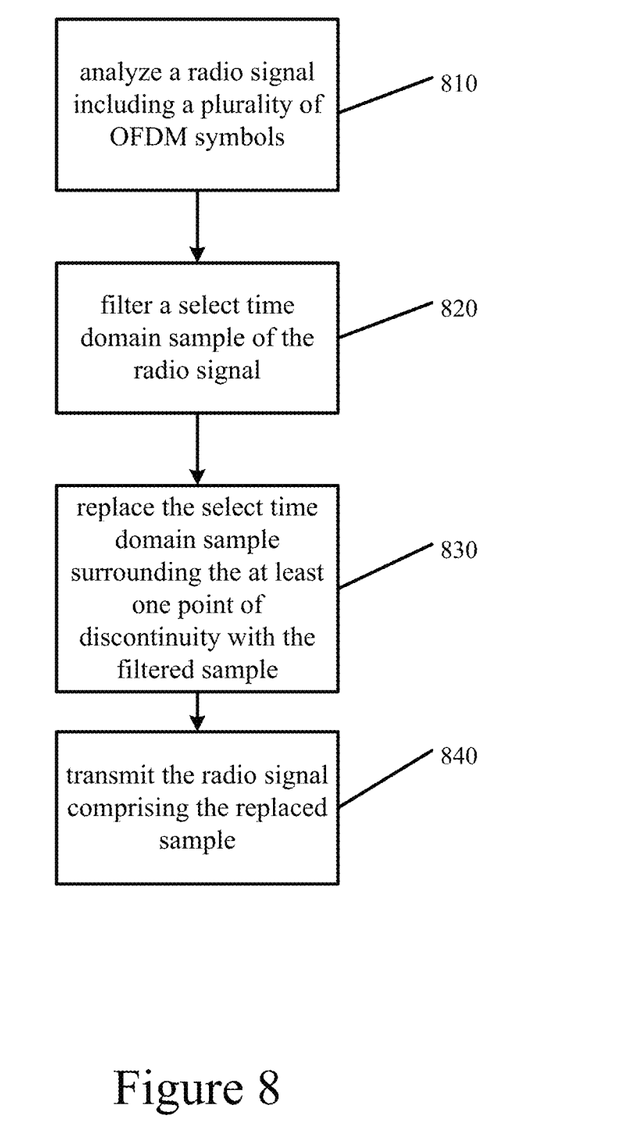
FIG. 8 illustrates a flow diagram according to certain embodiments.

FIG. 8 illustrates a flow diagram according to certain embodiments. In particular, FIG. 8 illustrates an embodiment from the perspective of a network entity, for example, a DFE component located inside a radio module of the base station. In step 810, the network entity may analyze a radio signal that comprises a plurality of symbols, for example OFDM symbols. The radio signal, in some embodiments, may comprise at least one point of discontinuity between the plurality of symbols. In other words, the discontinuity may occur in at least one border between the plurality of symbols. In some embodiments, the discontinuity may be caused by a phase difference between the symbols.

In step 820, the network entity may filter a select time domain sample of the radio signal. The selected sample may border the at least one point of discontinuity. The selected sample may be at least two samples, one sample being part of a first symbol and one sample being part of a second symbol, as shown in FIG. 4. In step 830, the select time domain sample surrounding the at least one point of discontinuity of the radio signal may be replaced with the filtered sample. In certain embodiments, therefore, partial filtering is used in which only the time domain sample surrounding the border between symbol, in which the at least one point of discontinuity occurs, are considered and filtered. In step 840, the network entity may transmit the radio signal comprising the replaced sample. The network entity may therefore use the radio signal with the filtered sample to send data to the user equipment.

In certain embodiments, the number of digital multipliers required by filters used in DFE may at least in part dictate the radio signaling capabilities of a network entity. For example, logical resource limitations of the network entity, which may be caused by price efficient device selection, may lead to performance issues and impact overall network capability. The use of other network entities, such as small cells with a passive cooling and power over Ethernet (POE) power supply, may impose even further limitations on the used resources. While in some embodiments a large number of multipliers may be used to fulfill a predetermined ACLR and/or a spectral emission mask threshold level, the large number of multipliers may be decreased with the use of partial filtering. Decreasing the number of multipliers may also help to decrease the number of resources used in the filtering process.

Figure 9:
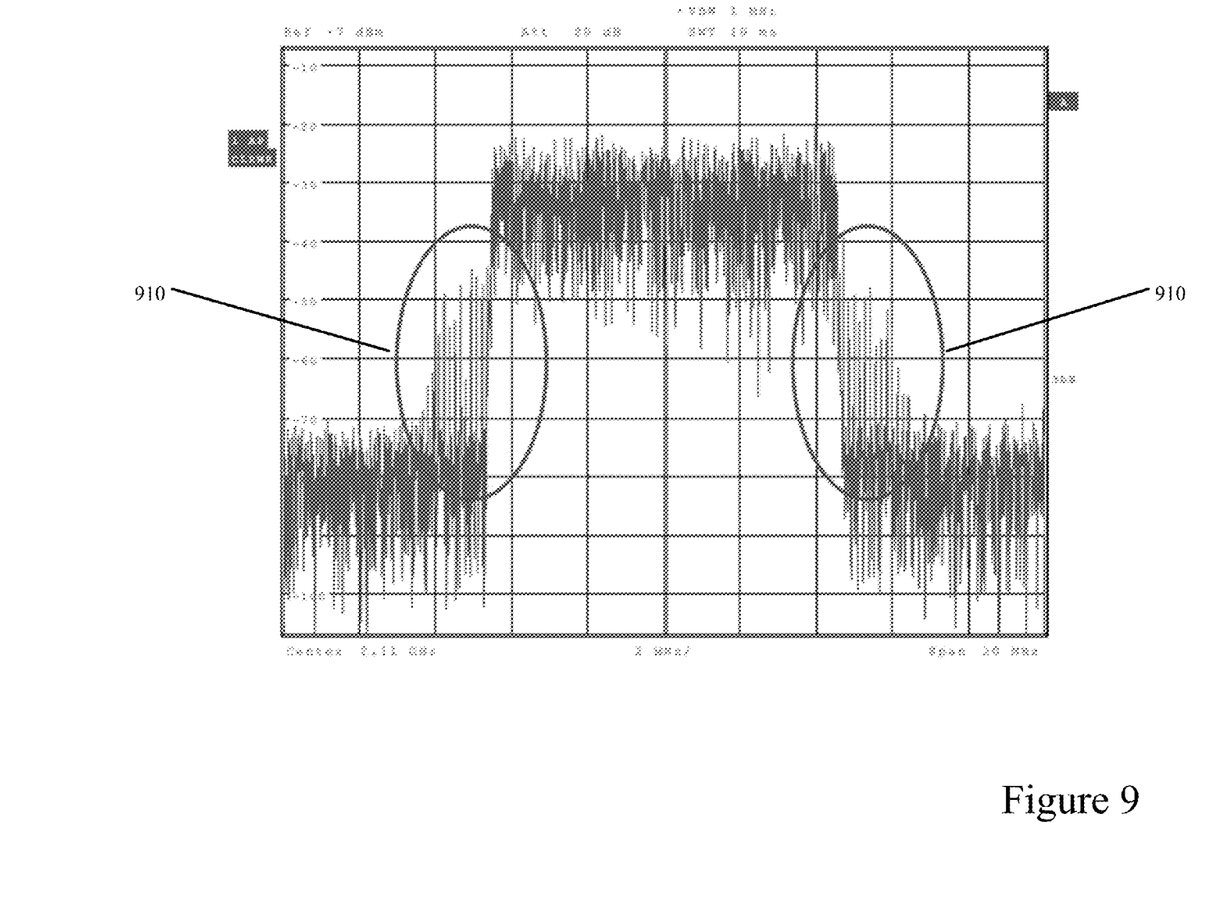
FIG. 9 illustrates power spectrum measurements according to certain embodiments.

FIG. 9 illustrates power spectrum measurements according to certain embodiments. Similar to FIGS. 6 and 7, FIG. 9 shows discontinuities 910 between OFDM symbols located at the boundaries of adjacent symbols. In partial filtering, as discussed in FIGS. 4 and 8, the filter may only be used for the selective filtering of samples surrounding the border between symbols in which the at least one discontinuity occurs. In such embodiments, the channel filter may remain idle or unused between the points of discontinuity of the radio signal. In certain embodiments, therefore, it may be beneficial to use time sharing to allow for a single filter to partially filter a plurality of radio signals.

Figure 10:
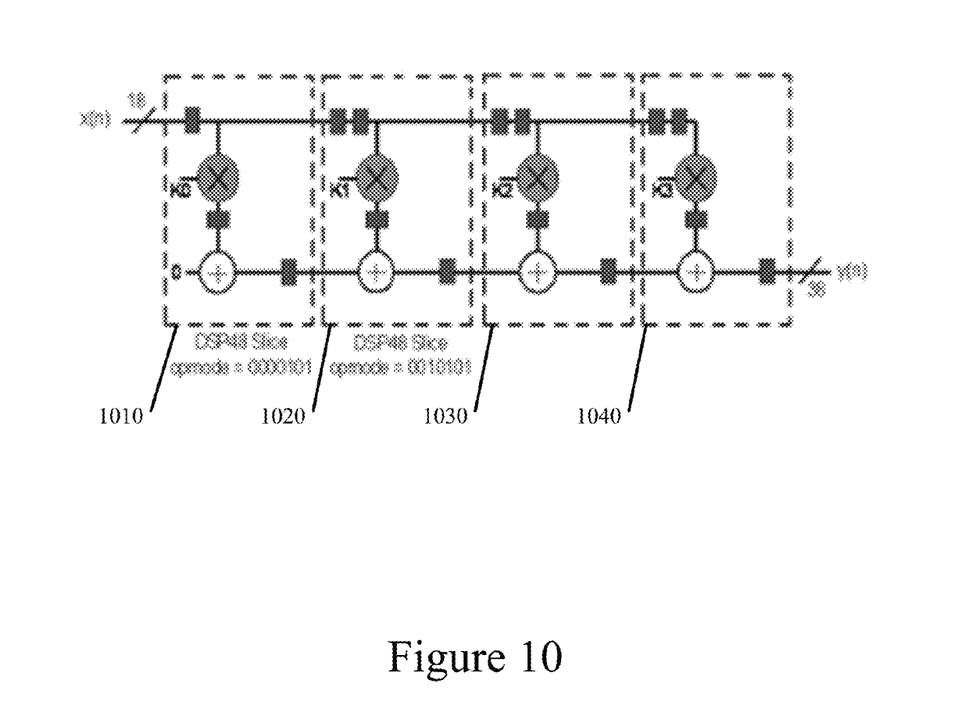
FIG. 10 illustrates a system according to certain embodiments.

In certain embodiments, the number of multipliers may be optimized based on the symmetry of impulse response. This may help to improve or reduce the number of multipliers by half Some channel filters, however, may have strict frequency characteristics that may prevent a half band implementation in accordance with the above embodiment. FIG. 10 illustrates a system according to certain embodiments. In particular, FIG. 10 illustrates a 2-antenna carrier having four instances of the channel filter, one for each component multiplied by the number of carriers. The component of complex digital signal, for example, may be an in-phase and quadrature component and/or main or diverse radio antenna signal.

As can be seen in FIG. 10, a first channel filter 1010, a second channel filter 1020, a third channel filter 1030, and/or a fourth channel filter 1040 are provided. Each channel filter may be used to process, analyze, or filter each OFDM symbol boundary or discontinuity in two or more separate radio signals or data streams. The filtering may occur simultaneously on each component.

Figure 11:
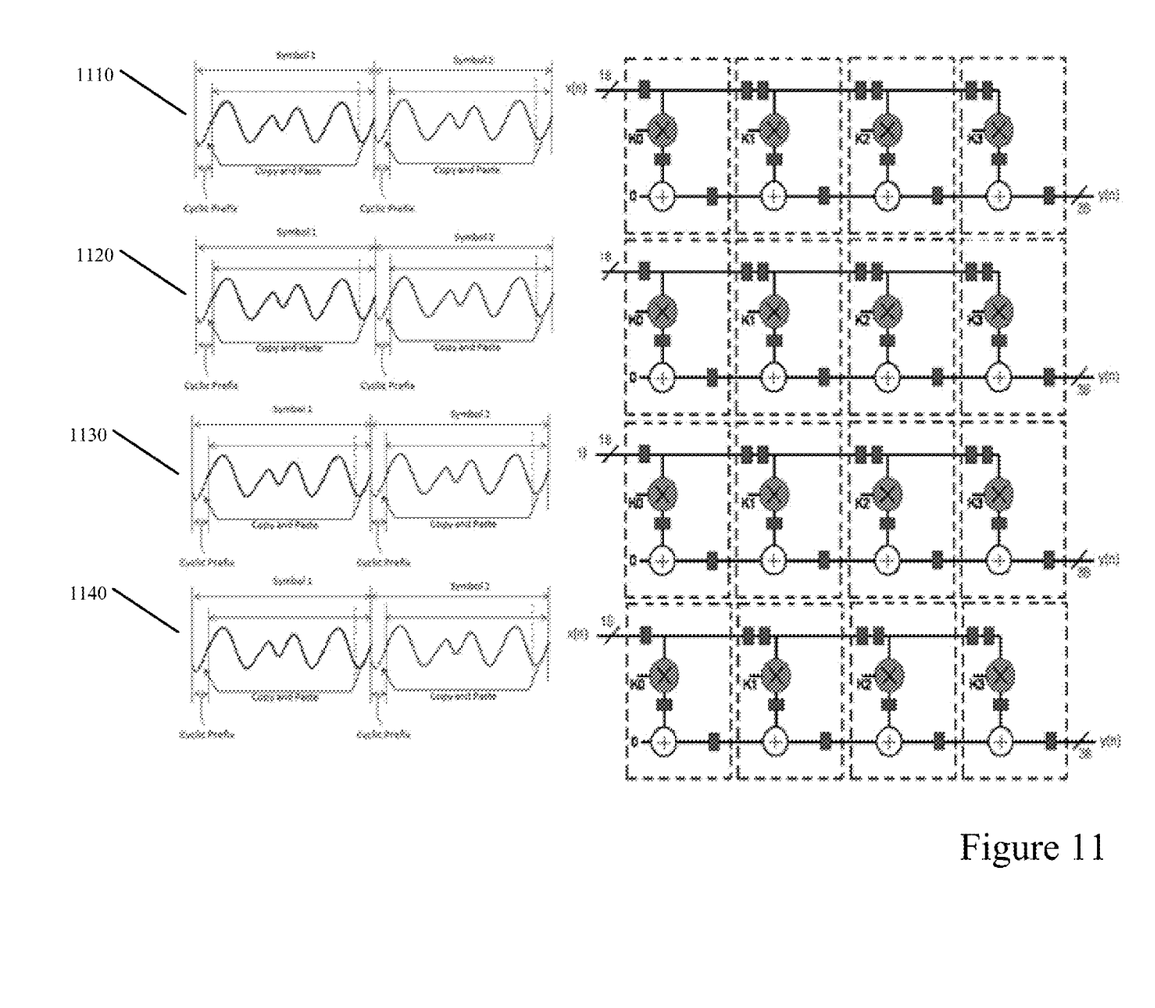
FIG. 11 illustrates a radio signal frame according to certain embodiments.

FIG. 11 illustrates a system according to certain embodiments. In particular, FIG. 11 illustrates four radio signals 1110, 1120, 1130, and 1140, four filters that utilize Long Term Evolution (LTE) physical layer timing to filter radio signals. Each OFDM symbol in the radio signals, for example, may be $1/14$ milliseconds long or $1/12$ milliseconds for extended cyclic prefix (ECP). Each filter may be used to analyze the separate radio signal comprising a plurality of OFDM symbols, wherein at least one point of discontinuity exists between the plurality of symbols. The filters may then be used to replace the select time domain sample surrounding the at least one point of discontinuity of the radio signal with the filtered sample, as described in FIGS. 4 and 8.

Figure 12:
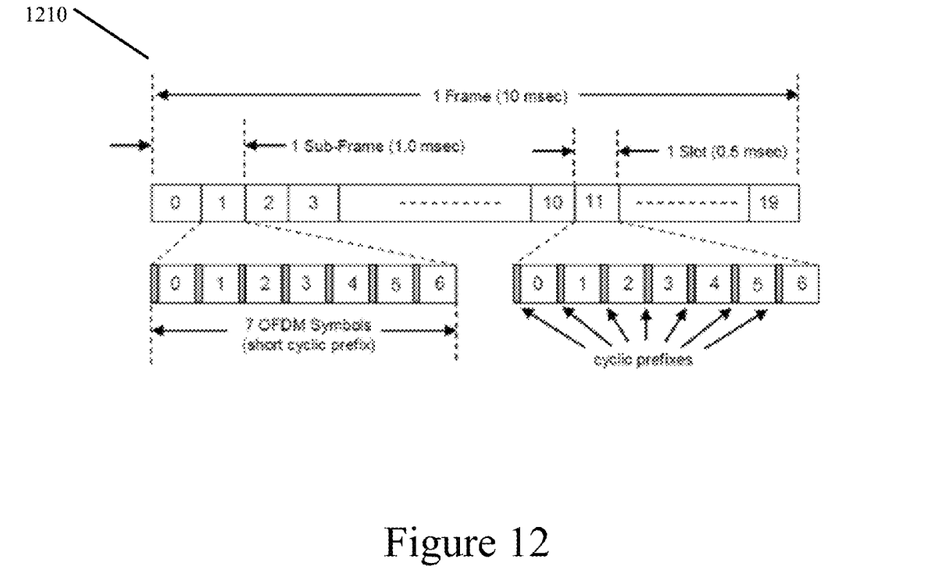
FIG. 12 illustrates a frame of a radio signal according to certain embodiments.

In certain embodiments, instead of using multiple filters that can each filter and replace the select time domain sample surrounding the at least one discontinuity in its respective radio signal, a single filter can be used to filter a plurality of radio signals or data streams. FIG. 12 illustrates a frame of a radio signal according to certain embodiments. In particular, FIG. 12 illustrates a single radio frame 1210 having a 10 millisecond length. The radio frame has twenty slots, each having a length of 0.5 milliseconds, and ten subframes, each having a length of 1.0 milliseconds. Each slot may include 7 OFDM symbols, with each symbol having a short cyclic prefix.

A single radio frame, such as the one shown in FIG. 12, can be used by a single channel filter to process a plurality of radio signals or data streams. In such embodiments, each radio signal or data stream may be offset to allow for the processing of multiple radio signals or data streams by a single filter. The filtered radio signals or data streams may then be combined back together after the processing. For example, each subframe in the single radio frame may be used to process a respective radio signal or data stream. A delay block, such as the delay block shown in FIG. 5, may be used to schedule and offset the radio signals in order to allow for a single filter to analyze and filter a plurality of radio signals.

Figure 13:
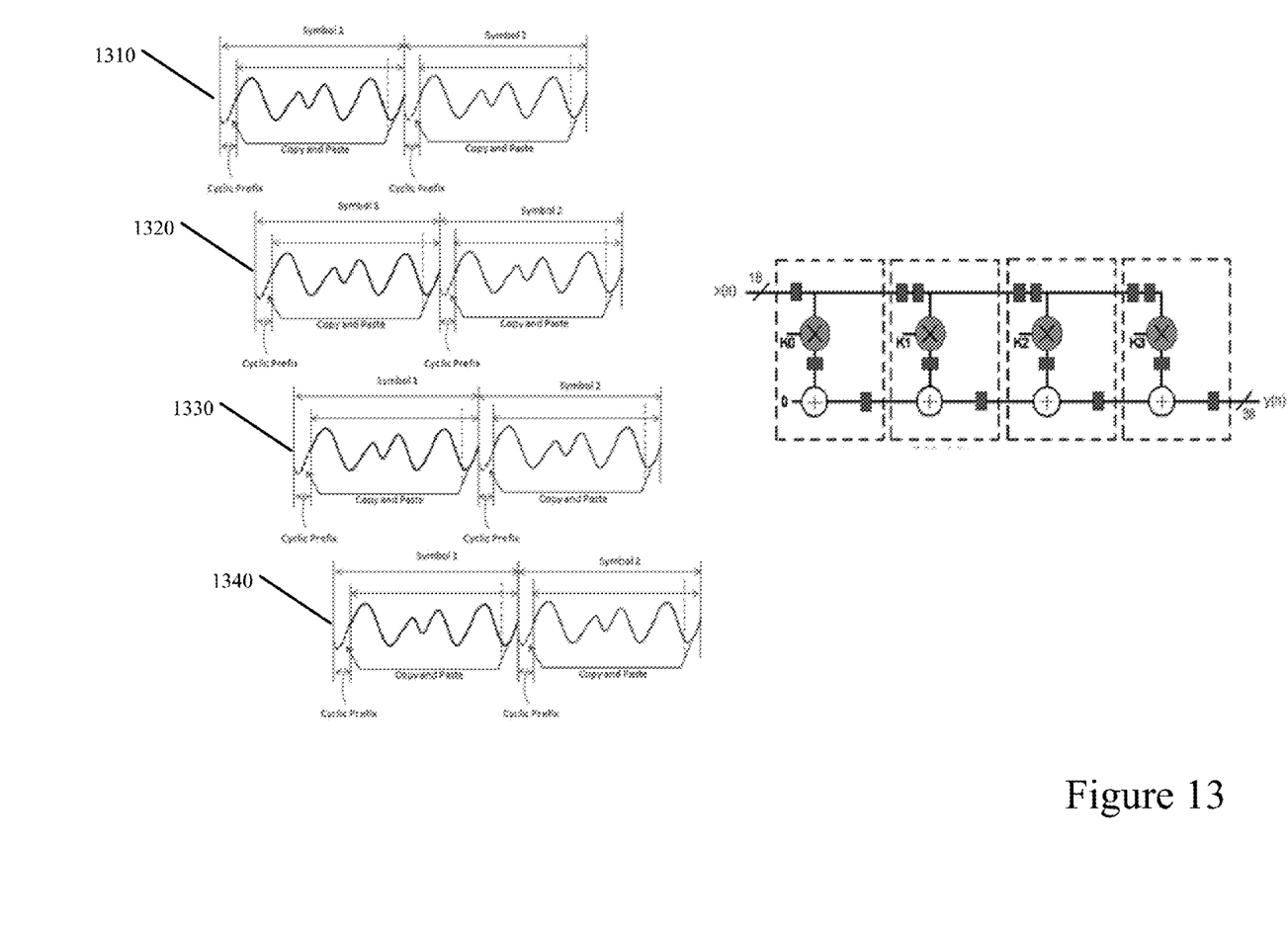
FIG. 13 illustrates a system according to certain embodiments.

FIG. 13 illustrates a system according to certain embodiments. In particular, FIG. 13 illustrates four data streams 1310, 1320, 1330, and 1340, and a single filter being used to analyze and filter all four radio signals. As shown in FIG. 13, the data streams are offset so that the discontinuities of the one or more data streams are offset. In other words, the cyclic prefix for each of the one or more data streams does not overlap. This time based sharing allows for a single channel filter to analyze, filter, and replace the select time domain sample surrounding the discontinuity. The radio signals may then be combined back together after the select time domain sample surrounding the discontinuity has been replaced. In other words, a single radio signal that includes two antennas data streams, for example a main antenna and a diversity antenna. Each antenna may be represented by a stream of the complex numbers, that includes an in-phase component and a quadrature component. Before the processing, the radio signal may be taken apart into four components: main in-phase, main quadrature, diversity in-phase, and diversity quadrature. Each component may be treated as a separate data stream.

Certain embodiments may use the same filter for all four components, so it may be helpful to store, buffer, and/or delay components that are currently not being processed, and later output all four components in parallel and/or together as a single radio signal again. In some embodiments, additional data may be stored when a single filter is used for multiple radio signals, because the single filter may keep the information of a plurality of radio signals until the information is combined. In addition, the exact timing for the drive switch operation of the radio signals may be stored, as well as a bypass pipeline or a queue to sustain delay values of the radio signals.

Figure 14:
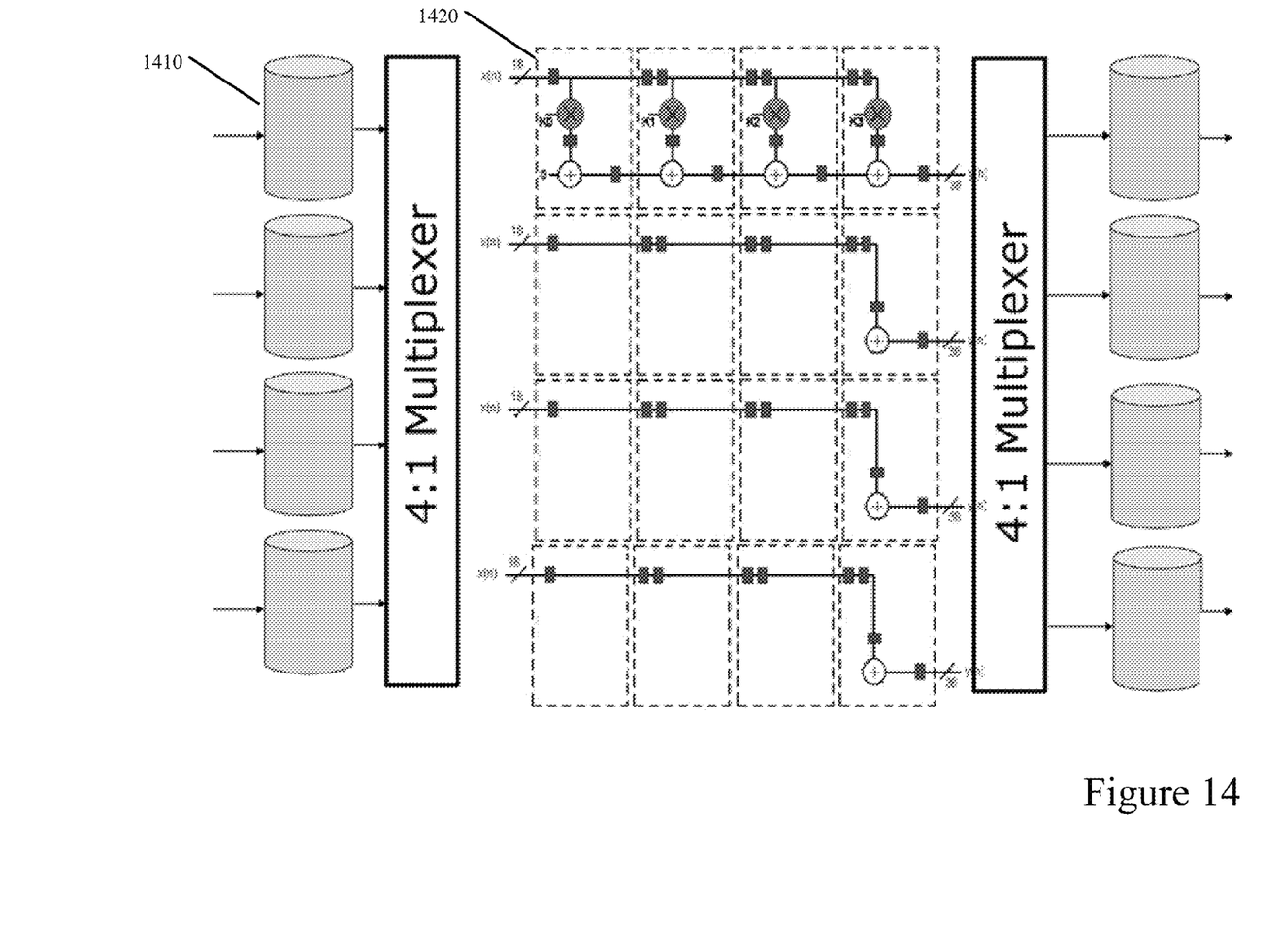
FIG. 14 illustrates a system according to certain embodiments.

FIG. 14 illustrates a system according to certain embodiments. In particular, FIG. 14 illustrates a four in one multiplexer 1410, in which a single filter 1420 may be used to analyze, filter, and replace at least one select time domain sample surrounding the discontinuity in a plurality of radio signals. Although the implementation shown in FIG. 14 may be complex and require additional information, the embodiment shown in FIG. 14 can be used to save FPGA logic resources and minimizes interference in the baseband signal.

Figure 15:
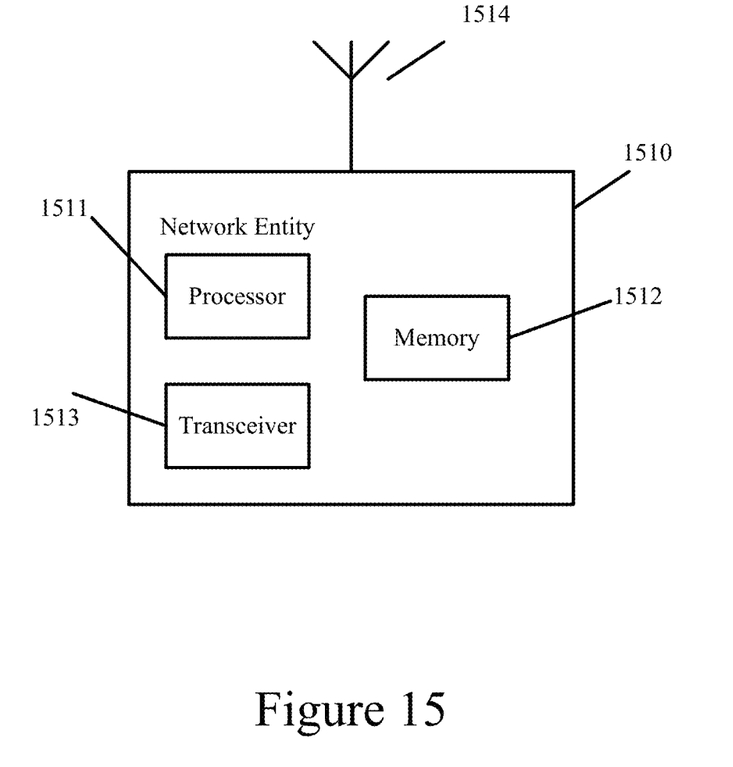
FIG. 15 illustrates a system according to certain embodiments.

FIG. 15 illustrates a system according to certain embodiments. It should be understood that each signal or block in FIGS. 1-14 may be implemented by various means or their combinations, such as hardware, software, firmware, one or more processors and/or circuitry. In one embodiment, a system may include for example, one or more than one network entity 1510. The network entity may be a base station, a network node, an access node, an evolved NodeB (eNB), a 5G small cell, an active antenna system, a 5G BTS, a 5G macro, a small cell access point, server, host, or any of the other access or network node discussed herein. Specifically, the network entity may include a DFE component inside a radio module of the base station.

Each of these devices may include at least one processor or control unit or module, indicated as 1511. At least one memory may also be provided, indicated as 1512. The memory may include computer program instructions or computer code contained therein. One or more transceivers 1513 may be provided, and the device may also include an antenna, illustrated as 1514. Although only one antenna is shown, many antennas and multiple antenna elements may be provided. Other configurations of the device may be provided. For example, network entity 1510 may be additionally configured for wired communication, in addition to wireless communication, and in such a case antenna 1514 may illustrate any form of communication hardware, without being limited to merely an antenna.

Transceiver 1513 may, independently, be a transmitter, a receiver, or both a transmitter and a receiver, or a unit or device that may be configured both for transmission and reception. The transmitter and/or receiver (as far as radio parts are concerned) may also be implemented as a remote radio head which may not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, network entity 1510 may transmit the radio signal to a user equipment. A user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a network entity 1510, may include means for carrying out embodiments described above in relation to FIGS. 1-14. In certain embodiments, at least one memory including computer program code can be configured to, with the at least one processor, cause the apparatus at least to perform any of the processes described herein.

According to certain embodiments, an apparatus 1510 may include at least one memory 1512 including computer program code, and at least one processor 1511. The at least one memory 1512 and the computer program code may be configured, with the at least one processor 1511, to cause the apparatus 1510 at least to analyze at a network entity a radio signal comprising a plurality of orthogonal frequency division multiplexing symbols. The radio signal comprises at least one point of discontinuity between the plurality of symbols. The at least one memory 1512 and the computer program code may also be configured, with the at least one processor 1511, to also cause the apparatus 1510 at least to filter a select time domain sample of the radio signal in the plurality of symbols. The select sample surrounding the at least one point of discontinuity. In addition, the at least one memory 1512 and the computer program code may be configured, with the at least one processor 1511, to cause the apparatus 1510 at least to replace the select time domain sample surrounding the at least one point of discontinuity with the filtered sample in the plurality of symbols.

Processor 1511 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. The channel filter used for partial filtering describes above may be implemented using a processor, for example a DSP, FPGA, or an ASIC.

For firmware or software, the implementation may include modules or unit of at least one chip set (for example, procedures, functions, and so on). Memory 1512 may independently be any suitable storage device, such as a non-transitory computer-readable medium. A hard disk drive (HDD), random access memory (RAM), flash memory, or other suitable memory may be used. The memory may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may either be fixed or removable.

The memory and the computer program instructions may be configured, with the processor for the particular device, to cause a hardware apparatus such as network entity 1510, to perform any of the processes described above (see, for example, FIGS. 1-14). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 15 illustrates a system including a network entity 1510, certain embodiments may be applicable to other configurations, and configurations involving additional elements, as illustrated and discussed herein. For example, multiple network entities and multiple users equipment may be present, or other nodes providing similar functionality, such as nodes that combine the functionality of a user equipment and an network entity, such as a relay node. The network entity 1510 may be configured for entity-to-entity communication or for entity-to-user equipment communication.

The above embodiments provide for improvements to the functioning of a network and/or to the functioning of the network entities or computers within the network, or the user equipment communicating with the network. Specifically, certain embodiments allow for power saving due to partial or selective filtering of the radio signal. Power consumption at the DFE may be particularly important, for example, in small cell base stations, active antenna systems, or any other network entity in the network. The power savings may allow the for the DSP resources to be shared among multiple filters, which can further decrease the size and power consumption of the system. In other embodiments, a single filter may be used, and the filtering may be optimized on a time share basis. This can help to further reduce the number of filters, and thereby decrease the number of resources utilized in the filtering of one or more radio signals.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to a 5G or 4G environment, other embodiments can be directed to other 3GPP technology, such as LTE advanced, LTE, or Internet of Things technology, or any other communication system that includes radio signals.

PARTIAL GLOSSARY

3GPP 3rd Generation Partnership Project
LTE Long Term Evolution
OFDMA Orthogonal Frequency Divided Multiple Access
OFDM Orthogonal Frequency Division Multiplexing
ACLR Adjacent Channel Leakage Ratio
DSP Digital Signal Processing
FIR Finite Impulse Response
EVM Error Vector Magnitude
FPGA Field Programmable Gate Array
ASIC Application Specific Integrated Circuits
5G BTS 5G base station

We claim:
1. An apparatus comprising:
a filter;
at least one processor; and
at least one memory including computer program code,
wherein the at least one memory and the computer program code are configured to, with the at least one processor, cause the apparatus at least to:
analyze at a network entity a radio signal comprising a plurality of orthogonal frequency division multiplexing symbols, wherein the radio signal comprises at least one point of discontinuity between the plurality of orthogonal frequency division multiplexing symbols;

filter a select time domain sample of the radio signal from the plurality of symbols, wherein the select time domain sample surrounds the at least one point of discontinuity;

replace the select time domain sample surrounding the at least one point of discontinuity with a filtered sample in the plurality of symbols, wherein the filter used for the filtering time domain sample comprises a delay block used to compensate for a phase shift of the radio signal.

2. The apparatus according to claim 1, wherein the at least one memory and the computer program code are also configured to, with the at least one processor, cause the apparatus at least to:

transmit the radio signal comprising the replaced select time domain sample.

3. The apparatus according to claim 1, wherein the discontinuity occurs on at least one border of the plurality of the orthogonal frequency division multiplexing symbols.

4. The apparatus according to claim 1, wherein the filtering of the time domain sample decreases an error vector magnitude of the radio signal.

5. The apparatus according to claim 1, wherein an adjacent channel leakage ratio of the radio signal is equal to or smaller than a predetermined maximum adjacent channel leakage ratio.

6. The apparatus according to claim 1, wherein radio resources used for the filtering and the replacing of the time domain sample are decreased by having the time domain sample border the discontinuity.

7. The apparatus according to claim 1, wherein the network entity comprises a small cell base station or an active antenna.

8. An apparatus comprising:
at least one processor; and
at least one memory including computer program code,
wherein the at least one memory and the computer program code are configured to, with the at least one processor, cause the apparatus at least to:
analyze at a network entity a radio signal comprising a plurality of orthogonal frequency division multiplexing symbols, wherein the radio signal comprises at least one point of discontinuity between the plurality of orthogonal frequency division multiplexing symbols;
filter a select time domain sample of the radio signal from the plurality of symbols, wherein the select time domain sample surrounds the at least one point of discontinuity;
replace the select time domain sample surrounding the at least one point of discontinuity with a filtered sample in the plurality of symbols; and
share a radio resource used by the network entity for the filtering and the replacing of the time domain sample with at least one other network entity.

9. The apparatus according to claim 1, wherein the filter is a single shared filter, and wherein the at least one memory and the computer program code are also configured to, with the at least one processor, cause the apparatus at least to:
use the single shared filter for the filtering and the replacing of the time domain sample for one or more radio channels.

10. The apparatus according to claim 9, wherein the at least one memory and the computer program code are also configured to, with the at least one processor, cause the apparatus at least to:

offset the at least one point of discontinuity of the one or more radio channels, wherein a cyclic prefix for each of the one or more radio channels does not overlap.

11. An apparatus comprising:
at least one processor; and
at least one memory including computer program code,
wherein the at least one memory and the computer program code are configured to, with the at least one processor, cause the apparatus at least to:
analyze at a network entity a radio signal comprising a plurality of orthogonal frequency division multiplexing symbols, wherein the radio signal comprises at least one point of discontinuity between the plurality of orthogonal frequency division multiplexing symbols;
filter a select time domain sample of the radio signal from the plurality of symbols, wherein the select time domain sample surrounds the at least one point of discontinuity;
replace the select time domain sample surrounding the at least one point of discontinuity with a filtered sample in the plurality of symbols;
use a single shared filter for the filtering and the replacing of the time domain sample for one or more radio channels; and
combine the filtered one or more radio channels after the filtering and replacing of the time domain samples in the single shared filter.

12. A method comprising:
analyzing at a network entity a radio signal comprising a plurality of orthogonal frequency division multiplexing symbols, wherein the radio signal comprises at least one point of discontinuity between the plurality of orthogonal frequency division multiplexing symbols;
filtering a select time domain sample of the radio signal from the plurality of symbols, wherein the select time domain sample surrounds the at least one point of discontinuity; and
replacing the select time domain sample surrounding the at least one point of discontinuity with a filtered sample in the plurality of samples, and
wherein a filter used for the filtering of the time domain sample comprises a delay block used to compensate for a phase shift of the radio signal.

13. The method according to claim 12, further comprising:
transmitting the radio signal comprising the replaced sample.

14. The method according to claim 12, further comprising:
sharing a radio resource used by the network entity for the filtering and the replacing of the time domain sample with at least one other network entity.

15. The method according to claim 12, further comprising:
using a single shared filter for the filtering and the replacing of the time domain sample for one or more radio channels.

16. The method according to claim 15, further comprising:
offsetting the at least one discontinuity of the one or more radio channels, wherein a cyclic prefix for each of the one or more radio channels does not overlap.

17. The method according to claim 15, further comprising:

combining the filtered one or more radio channels after the filtering and replacing of the time domain samples in the single shared filter.

\* \* \* \* \*